Nov. 4, 1952 W. BEUKEMA 2,616,967

AMPLITUDE LIMITING CIRCUIT ARRANGEMENT

Filed March 8, 1950

INVENTOR.
WILLEM BEUKEMA
BY Fred M Vogel
AGENT

Patented Nov. 4, 1952 2,616,967

UNITED STATES PATENT OFFICE 2,616,967

AMPLITUDE LIMITING CIRCUIT ARRANGEMENT

Willem Beukema, Eindhoven, Netherlands, assignor to Hartford National Bank and Trust Company, Hartford, Conn., as trustee Application March 8, 1950, Serial No. 148,422
In the Netherlands March 10, 1949

5 Claims. (Cl. 178—44)

The present invention relates to circuits for limiting the amplitude of electrical oscillations, comprising an amplifying tube, the control-grid circuit of which includes a circuit tuned to the frequency of the oscillations to be limited and the output circuit of which includes an amplitude detector and the output electrodes for deriving the limited oscillations.

In a known circuit of this kind, the amplitude detector is connected in such manner that, if the oscillations generated in the output circuit of the amplifying tube have a comparatively large amplitude, a control voltage is produced in the output circuit of the amplitude detector. This control voltage reduces the mutual conductance of the amplifying tube, compensating for the first-mentioned increase in amplitude.

In a further known circuit, the oscillations to be limited are supplied to an amplifying tube, the grid circuit of which includes a condenser and a resistance across which appears a control voltage. This control voltage also reduces the tube mutual conductance at comparatively high input amplitudes. The control may, however, become so great that the output amplitude decreases with increasing input amplitude.

The principal object of the present invention is to provide a simple and effective circuit arrangement for limiting amplitude modulations.

Another object of the invention is to provide an amplitude limiter circuit exhibiting high stability and sensitivity.

Further objects of the invention will appear from the following description.

The circuit according to the invention is based on a different principle which allows a greater suppression of unwanted amplitude modulation. It is characterized in that the output voltage of the amplitude detector is supplied to the control-grid circuit of the amplifying tube in in-phase relationship, so that an increase in amplitude of the input oscillation results in greater control-grid current and hence greater damping of the tuned circuit.

Figure 1:
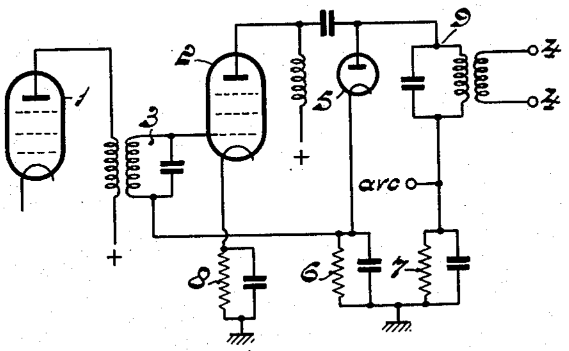
Figure 2:
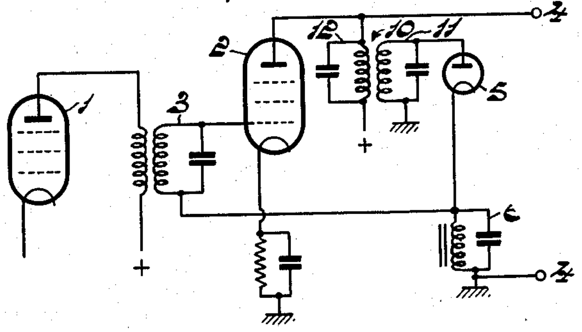

The invention will now be explained more fully by reference to the accompanying drawing, in which:

Figure 1 shows a schematic diagram of a limiter circuit according to the invention, and Figure 2 shows a further embodiment of the circuit illustrated in Fig. 1.

Referring now to the drawing, and more particularly to Fig. 1, the oscillations to be limited, which may be, for example, frequency-modulated oscillations having unwanted amplitude modulation components, are produced in the output circuit of an amplifying tube 1 and are applied to the input circuit of an amplifying tube 2. The control-grid circuit of tube 2 includes a circuit 3 which is tuned to the frequency of the incoming oscillations.

The oscillations developed in the output circuit of the amplifying tube 2 are supplied to an amplitude detector which comprises a rectifier 5 and an output filter 6. The time-constant of filter 6 is shorter than the period of the highest audio-frequency to be transmitted. A filter 8, which is included in the cathode circuit of tube 2, provides a negative grid bias for tube 2.

According to the invention, the rectifier 5 has a unidirectional characteristic such that, upon an increase in amplitude of the output oscillation of tube 2, a higher positive voltage is produced across the filter 6. This voltage brings about a decrease in the negative grid bias of tube 2. As a result, a greater control-grid current starts to flow in this tube, bringing about greater damping of the tuned circuit 3. The oscillations produced at a pair of output terminals 4, which terminals are coupled to the output circuit of tube 2, thus exhibit a substantially constant amplitude.

In contradistinction with the first-mentioned known circuit, the control grid of tube 2 is adjusted to a less negative value upon increase in amplitude of the output oscillation, while in the known circuit the said grid is, as a rule, adjusted to a more negative value. The circuit arrangement according to the invention exhibits greater stability than the known circuits because it is not necessary to employ networks or amplifiers between the filter 6 and the control-grid of tube 2.

The circuit exhibits a sensitivity higher than that of the second known circuit because a high control-voltage is available for producing control-grid current to damp circuit 3.

In order to bring about greater suppression of unwanted amplitude modulation, a second filter 7, which has a time-constant longer than the period of the lowest audio-frequency to be suppressed, may be included in the circuit of the amplitude detector 5—6. Across the filter 7 there appears a voltage equal to the mean amplitude of the oscillations set up at the output electrodes 4. A momentary increase in amplitude of the said oscillations will thus cause a considerable current to flow through the rectifier 5, so that this increase in amplitude will be suppressed. The voltage set up across the filter 7 may further be used for automatic gain control.

Fig. 2 shows a circuit in which additional suppression of unwanted amplitude modulation may alternatively be ensured with the use of a rectifier 5 having a comparatively high internal resistance. For this purpose, the output circuit of the amplifying tube 2 includes an impedance-inverting network 10 constituted, for example by two tuned circuits 11, 12, which circuits are overcritically coupled. The output of network 10 is supplied to the amplitude detector 5, 6. As in Fig. 1, the network 6 has a time-constant shorter than the period of the highest modulation frequency to be suppressed, so that here again an oscillation is produced corresponding to the unwanted amplitude modulation. The amplitude detector 5, 6 thus constitutes an impedance which tends to suppress the amplitude modulation of the current traversing this impedance, so that the amplitude modulation of the voltage is suppressed at the input of the impedance-inverting network 10. This method has been extensively described in the former application Ser. No. 727,443, filed February 8, 1947 by Jacob van Slooten, and having a common assignee with this application.

While I have described my invention in a specific use thereof and in a specific embodiment, I do not wish to be limited thereto, for obvious modifications will occur to those skilled in the art without departing from the spirit and scope of the invention.

What I claim is:

1. An electrical circuit-arrangement for limiting amplitude modulation components of an applied signal, comprising an electron discharge tube having a cathode, a control grid and an output electrode, an input circuit having a given damping and tuned to the frequency of said signal coupled to said control grid, an amplitude detector circuit coupled to the said output electrode, means to derive a control voltage from said detector and to apply said control voltage to said control grid in regenerative relationship to produce grid current flow in said discharge tube thereby to increase the damping of said input circuit as the amplitude of the applied signal increases.

2. An electrical circuit arrangement for limiting amplitude modulation components of an applied signal, comprising an electron discharge tube having a cathode, a control grid and an output electrode, an input circuit having a given damping and tuned to the frequency of said signal coupled to said control grid, an amplitude detector circuit coupled to said output electrode and comprising a rectifier element and a filter network having a time constant shorter than the minimum period of said modulation components, means to derive a control voltage from said filter and to apply said control voltage to said control grid in regenerative relationship to produce grid current flow in said discharge tube thereby to increase the damping of said input circuit as the amplitude of the applied signal increases.

3. An electrical circuit arrangement for limiting amplitude modulation components of an applied signal, comprising an electron discharge tube having a cathode, a control grid and an output electrode, an input circuit having a given damping and tuned to the frequency of said signal coupled to said control grid, an amplitude detector circuit coupled to said output electrode and comprising a rectifier element and a first filter network having a time constant shorter than the minimum period of said modulation components, a load circuit coupled in parallel with said amplitude detector circuit and including a second filter network having a time constant longer than the maximum period of said modulation components, means to derive a control voltage from said first filter and to apply said control voltage to said control grid in regenerative relationship to produce grid current flow in said discharge tube thereby to increase the damping of said input circuit as the amplitude of the applied signal increases.

4. An electrical circuit arrangement for limiting amplitude modulation components of an applied signal, comprising an electron discharge tube having a cathode, a control grid and an output electrode, an input circuit having a given damping and tuned to the frequency of said signal coupled to said control grid, an impedance inverting network coupled to said output electrode, an amplitude dectector circuit coupled to said impedance inverting network and comprising a rectifier element and a filter network having a time constant smaller than the minimum period of said modulation components, means to derive a control voltage from said filter and to apply said control voltage to said control grid in regenerative relationship to produce grid current flow in said discharge tube thereby to increase the damping of said input circuit as the amplitude of the applied signal increases.

5. An electrical circuit arrangement for limiting amplitude modulation components of an applied signal, comprising an electron discharge tube having a cathode, a control grid and an output electrode, an input circuit having a given damping and tuned to the frequency of said signal coupled to said control grid, an impedance inverting network comprising a pair of overcritically coupled resonant circuits coupled to said output electrode, an amplitude detector circuit coupled to said impedance inverting network and comprising a rectifier element and a filter network having a time constant smaller than the minimum period of said modulation components, means to derive a control voltage from said filter and to apply said control voltage to said control grid in regenerative relationship to produce grid current flow in said discharge tube thereby to increase the damping of said input circuit as the amplitude of the applied signal increases.

WILLEM BEUKEMA.

REFERENCES CITED

The following references are of record in the file of this patent:

UNITED STATES PATENTS

| Number | Name | Date |
|---|---|---|
| 2,395,615 | Curtis | Feb. 26, 1946 |
| 2,512,658 | Levy | June 27, 1950 |
| 2,524,556 | Worchester, Jr. | Oct. 3, 1950 |